United States Patent
Yang

(10) Patent No.: US 12,373,413 B2
(45) Date of Patent: Jul. 29, 2025

(54) DISTRIBUTED COMPUTING SYSTEMS AND METHODS THEREFOR

(71) Applicant: Xincheng Yang, Chicago, IL (US)

(72) Inventor: Xincheng Yang, Chicago, IL (US)

(*) Notice: Subject to any disclaimer, the term of this patent is extended or adjusted under 35 U.S.C. 154(b) by 23 days.

(21) Appl. No.: 18/403,075

(22) Filed: Jan. 3, 2024

(65) Prior Publication Data
US 2024/0220471 A1    Jul. 4, 2024

Related U.S. Application Data

(60) Provisional application No. 63/437,055, filed on Jan. 4, 2023.

(51) Int. Cl.
*G06F 16/27* (2019.01)
*G06F 16/22* (2019.01)
*G06F 16/23* (2019.01)

(52) U.S. Cl.
CPC ...... *G06F 16/2246* (2019.01); *G06F 16/2365* (2019.01); *G06F 16/278* (2019.01)

(58) Field of Classification Search
CPC ....... G06F 16/2246; G06F 16/23–2322; G06F 16/2365; G06F 16/278
See application file for complete search history.

(56) References Cited

U.S. PATENT DOCUMENTS

| | | | |
|---|---|---|---|
| 7,779,074 B2 | 8/2010 | Surtani et al. | |
| 9,436,502 B2 | 9/2016 | Burckhardt et al. | |
| 2018/0173745 A1 | 6/2018 | Balasubramanian et al. | |
| 2022/0382674 A1* | 12/2022 | Wang | G06F 16/245 |
| 2023/0281190 A1* | 9/2023 | Mylavarapu | G06F 16/278 707/703 |

OTHER PUBLICATIONS

Apache Zookeper, "Class Learner," retrieved from https://zookeeper.apache.org/doc/r3.5.5/api/org/apache/zookeeper/server/quorum/Learner.html on Nov. 17, 2022, 6 pages (2008).

Benoit, et al., "Partitioning tree-shaped task graphs for distributed platforms with limited memory," HAL-Inria Research Report No. RR-9115, 38 pages (2019).

Burns, et al., "Borg, Omega, and Kubernetes," Communications of the ACM 59(5), pp. 50-57 (2016).

(Continued)

*Primary Examiner* — Robert W Beausoliel, Jr.
*Assistant Examiner* — Nirav K Khakhar
(74) *Attorney, Agent, or Firm* — Foley & Lardner LLP

(57) ABSTRACT

Distributed computing systems and methods therefore may include one or more processors which maintain a propagatable partition tree, the propagatable partition tree including a plurality of nodes corresponding to a group of one or more processes, the propagatable partition tree determining the commit order between each of the plurality of nodes. A first processor may receive a plurality of write requests for a data item, store a timestamp for each write request of the plurality of write requests and metadata associated with each write request, determine a global order for the plurality of write requests, based on an index assigned to respective write requests of the plurality of write requests, and execute the plurality of write requests, according to the propagatable partition tree, based on the global order.

20 Claims, 14 Drawing Sheets

(56) References Cited

OTHER PUBLICATIONS

Cheng, et al., "Making {Geo-Replicated} systems fast as possible, consistent when necessary," 10th USENIX Symposium on Operating Systems Design and Implementation (OSDI 12), pp. 265-278 (2012).
Coreos, "etcd-team," retrieved from https://github.com/bmizerany/etcd-team on Nov. 17, 2022, 4 pages (2014).
Garcia-Molina & Spauster, et al., "Ordered and reliable multicast communication," ACM Transactions on Computer Systems 9(3), pp. 242-271 (1991).
Gilbert & Lynch, "Perspectives on the CAP Theorem," Computer 45(2), pp. 30-36 (2012).
Golodetz, "Divide and Conquer: Partition Trees and Their Uses," Overload 86, pp. 24-29 (2008).
Hunt, et al., "{ZooKeeperg} Wait-free coordination for internet-scale systems," USENIX ATC '10: 2010 USENIX Annual Technical Conference, pp. 145-158 (2010).
Jia, "A total ordering multicast protocol using propagation trees," IEEE Transactions on Parallel and Distributed Systems 6(6), pp. 617-627 (1995).
Junqueira, et al., "Zab: High-performance broadcast for primary-backup systems," 2011 IEEE/IFIP 41st International Conference on Dependable Systems & Networks (DSN), pp. 245-256 (2011).
Kraska, et al., "MDCC: multi-data center consistency," EuroSys '13: Proceedings of the 8th ACM European Conference on Computer Systems, pp. 113-126 (2013).
Lamport, "How to Make a Multiprocessor Computer That Correctly Executes Multiprocess Programs," IEEE Transactions on Computers C-28(9), pp. 690-691 (1979).
Lamport, "Paxos Made Simple," ACM SIGACT News (Distributed Computing Column) 34(4), pp. 51-58 (2001).
Lev-Ari, "Zoonet github repository," retrieved from https://github.com/kfirlevari/ZooNet on Nov. 17, 2022, 3 pages (2021).
Lev-Ari, et al., "Composing ordered sequential consistency," Information Processing Letters 123, pp. 47-50 (2017).
Lev-Ari, et al., "Modular Composition of Coordination Services," 2016 USENIX Annual Technical Conference (USENIX ATC '16), pp. 251-264 (2016).
Liu & Vukolic, "Leader Set Selection for Low-Latency Geo-Replicated State Machine," IEEE Transactions on Parallel and Distributed Systems 28(7), pp. 1933-1946 (2017) (14 page manuscript provided).
Lu, "AdaptDB : adaptive partitioning for distributed joins," Masters Thesis, Massachusetts Institute of Technology, Department of Electrical Engineering and Computer Science, 59 pages (2017).
Lu, et al., "AdaptDB: Adaptive Partitioning for Distributed Joins," Proceedings of the VLDB Endowment 10(5), pp. 589-600 (2017).
Nadeau & Leung, "Message-ordered multicast by common building blocks," InfoScale '06: Proceedings of the 1st international conference on Scalable information systems, 10 pages (2006).
Nakamoto, "Bitcoin: A Peer-to-Peer Electronic Cash System," Decentralized Business Review, 9 pages (2008).
Ongaro & Ousterhout, "In Search of an Understandable Consensus Algorithm," 2014 USENIX Annual Technical Conference (Usenix ATC 14), pp. 305-319 (2014).
Rook, "Open-Source, Cloud-Native Storage for Kubernetes," retrieved from https://rook.io/ on Nov. 17, 2022, 6 pages.
Shvachko, et al., "The Hadoop Distributed File System," 2010 IEEE 26th Symposium on Mass Storage Systems and Technologies (MSST), 10 pages (2010).
Tikhomirov, "Ethereum: State of Knowledge and Research Perspectives," International Symposium on Foundations and Practice of Security, 16 pages (2017).
Traiger, et al., "Transactions and consistency in distributed database systems," ACM Transactions on Database Systems 7(3), pp. 323-342 (1982).
Wu, et al., "SPANStore: cost-effective geo-replicated storage spanning multiple cloud services," SOSP '13: Proceedings of the Twenty-Fourth ACM Symposium on Operating Systems Principles, pp. 292-308 (2013).

* cited by examiner

DISTRIBUTED COMPUTING SYSTEMS AND METHODS THEREFOR

CROSS-REFERENCE TO RELATED APPLICATIONS

This application claims the benefit of and priority to U.S. Provisional Application No. 63/437,055, filed on Jan. 4, 2023, the contents of which are incorporated herein by reference in their entirety.

TECHNICAL FIELD

This disclosure is directed to distributed computing systems and methods therefor, including, but not limited to, systems and methods for providing a distributed data structure to maintain sequential consistency.

BACKGROUND

In a network environment in which distributed applications are provided, sequential consistency may be needed to provide application correctness. However, where applications are distributed across wide geographic regions, latency in message exchange can result in consistency reduction.

SUMMARY

Some solutions for providing increased consistence may include deploying distinct instances of a coordination service in each geographic cluster, then loosely coupling those services. Unfortunately, the consistency standards of the individual coordination service instances do not compose when coupled this way, so such an approach may sacrifice sequential consistency.

According to the systems and methods described herein, a distributed computing system may include a consistent, propagatable partition tree (CoPPar Tree). The CoPPar Tree may be a data structure that spans multiple data centers and data partitions, and that realizes sequential consistency using divide-and conquer. In particular, by leveraging the geospatial affinity of data used in global services, the CoPPar Tree can localize reads and writes in a sequentially consistent manner, thus improving the overall performance of the coordination service deployed at global scale. The systems and methods described herein may leverage, enhance, or otherwise incorporate a centralized service which maintains configuration information, naming, and provides distributed synchronization and group services (such as ZooKeeper™). The systems and methods described herein may deploy or use an extension (e.g., referred to as ZooTree) to implement a CoPPar tree that enhances the centralized service, without changing existing centralized service clusters (such as ZooKeeper™ clusters). The systems and methods described herein may produce a 10× speedup for reads and up to 5× speedup for writes relative to other solutions. Additionally, the ZooTree extension can achieve a 3× speedup over prior approaches for a globally-coordinated application example.

In various aspects, this disclosure is directed to systems and methods for distributed computing. One or more processors may maintain a propagatable partition tree, the propagatable partition tree including a plurality of nodes corresponding to a group of one or more processes, the propagatable partition tree determining the commit order between each of the plurality of nodes, the groups of one or more processes including a plurality of primitive groups and a plurality of composer groups, wherein the one or more processors implement inverse propagation to transmit requests through the propagatable partition tree. A first processor of the distributed processing system may receive a plurality of write requests for a data item, the plurality of write requests including a first write request for the data item and a second write request for the data item. The first processor may store a timestamp for each write request of the plurality of write requests and metadata associated with each write request. The first processor may determine a global order for the plurality of write requests, based on an index assigned to respective write requests of the plurality of write requests, the index corresponding to the timestamp and the metadata associated with each write request. The first processor may execute the plurality of write requests, according to the propagatable partition tree, based on the global order.

In some embodiments, the index comprises a first index. The a second processor of the distributed processing system may receive a plurality of read requests for a data item, the plurality of read requests including a first read request for the data item and a second read request for the data item. The second processor may store a timestamp for each read request in the plurality of write request and metadata associated with each read request. The second processors may determine a global read order for the plurality of read requests, based on a second index assigned to respective read requests of the plurality of read requests, the second index corresponding to the timestamp and the metadata associated with each read request. The second processor may execute the plurality of read requests, according to the propagatable partition tree, based on the global read order for the plurality of read requests.

In some embodiments, the first processor may broadcast, to the second processor, the first write request for the data item and the second write request for the data item. The second processor may broadcast, to the first processor, the first read request for the data item and the second read request for the data item. The one or more processors may assign the first index and the second index, to the first write request for the data item, the second write request for the data item, the first read request for the data item, and the second read request for the data item. In some embodiments, the one or more processors may determine the global read order by ordering one or more operations corresponding to the global read order, based on the first index and the second index assigned to each of the respective write and read requests, the one or more operations including the first write request, the first read request, the second write request, and the second read request. In some embodiments, the one or more processors may determine a first local order for the one or more operations of a first data center, determine a second local order for the one or more operations of a second data center, and generate a local order for the one or more operations of the first data center and second data center, based on the first local order and the second local order.

In some embodiments, the propagatable partition tree includes a distributed inverted tree structure. In some embodiments, the one or more processors may propagate the propagatable partition tree based on the global order by a first composition or a second composition. In some embodiments, the one or more processors may propagate the propagatable partition tree by imposing a queue using a first-in-first-out order on commit messages received from different partitions, based on an arrival time of the commit messages, to sort write requests. In some embodiments, propagating the propagatable partition tree includes blocking a first commit message based on an order of messages in the first-in-first-out order of the queue, executing a second commit message based on the order of messages in the first-in-first-out order of the queue, and executing the first commit message after the completion of the second commit message. In some embodiments, propagating the propagatable partition tree by the second composition includes receiving a first commit message and a second commit message by a leader, the leader recording an order for the first commit message and the second commit message, and executing the first and second commit messages based on the order recorded by the leader.

BRIEF DESCRIPTION OF THE FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
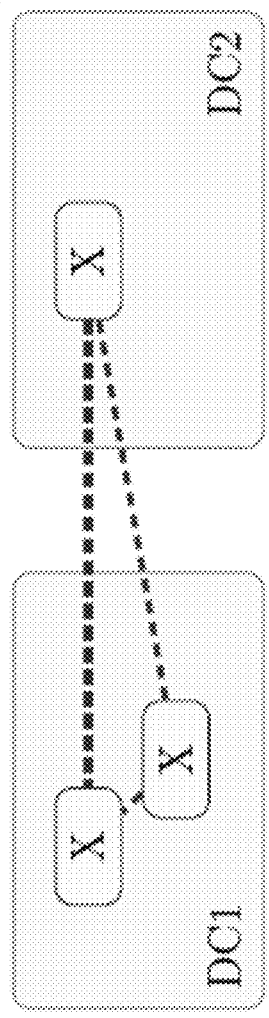
FIG. 1A-FIG. 1B are example implementations for global coordination.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes an overview of the systems and methods described herein;

Section B describes various implementations of coordination services;

Section C describes systems and methods for a Consistent Propagatable Partition tree.

Section A. Overview of Systems and Methods Described Herein

Coordination services may service as a form a building block for distributed applications. For example, various services, applications, or resources may use a coordination service (such as ZooKeeper™). Developers may rely on a consistency model provided by a coordination service to reason about correctness. For example, linearizability provides the strongest consistency results, giving the illusion of a non-replicated service. Sequential consistency may preserve program ordering. Coordination services may achieve these consistency results by relying on consensus protocols which use expensive quorum voting to reach agreement. Coordination services that rely on consensus protocols may limit scalability, and thus result in deployment of such coordination services in small clusters of machines within a single data center. However, many internet-scale services may have deployments that span separate data centers and geographical regions to achieve high performance for clients that span the globe. As such, coordination services should provide strong consistency guarantees and span the globe while retaining performance.

To implement a global service, a system can maintain separate coordination services in different geographical regions, and loosely couple the coordination services to implement global consistency. Unfortunately, sequential consistency, an important and widely used model, may not compose in this manner. In other words, even though the separate clusters can provide sequential consistency, the overall service as a global entity may not provide sequential consistency. The simple solution to this problem is to deploy a single cluster globally, which may limit performance of the service. However, geospatial relationships in the data used by globally distributed applications present an opportunity for partitioning such data along geographic lines, reducing the need for frequent coordination. For example, an airline ticketing system might leverage the fact that customers tend most often to purchase tickets for domestic flights. According to the systems and methods described herein, a global service can deploy a divide-and-conquer strategy that partitions clients into different groups and realizes sequential consistency at the group level, achieving composable consistency with significantly higher performance and without explicit client-side synchronization. This partitioning strategy leverages a data structure referred to as a Consistent Propagatable Partition tree (CoPPar Tree). By implementing CoPPar Tree in the context of a coordination services system (e.g., as an extension of ZooKeeper™), the systems and methods described herein may achieve global, composable, sequential consistency in a performant manner.

According to the systems and methods described herein, a CoPPar Tree data structure may provide sequential consistency compose at a global scale. The CoPPar Tree may sequentially consistent coordination services to be implemented and verified independently while maintaining global sequential consistency. The systems and methods described herein may provide or leverage a divide-and-conquer approach for scalable consistency. According to the systems and methods described herein, data can be localized to data centers within the same region while still realizing sequential consistency. This approach favors loose availability in lieu of sacrificing performance or consistency. The systems and methods described herein may implement a CoPPar tree as an extension of a coordination services system (such as ZooKeeper™), referred to as a ZooTree. While described as an implementation in the context of ZooKeeper™, the systems and methods described herein may be built on top of other coordination services as well.

Section B. Coordination Services

Coordination services may run as a set of distributed processes (replicas) that replicate state. Coordination services may rely on an underlying state machine replication (SMR) protocol to implement fault tolerance and consistency. Such SMR protocols may be classified into two categories: leader-based and leaderless. A leaderless approach of SMR may initialize a process with three roles: acceptor, proposer, and learner. The proposer may choose a proposal for a value if the majority of acceptor processes accept that value, thus reaching agreement. The learner may learn the chosen value to implement replicas are in a consistent state. In contrast, a leader-based approach of SMR initializes processes with the roles of leader, follower, and observer. The leader and follower processes may cast votes in the SMR protocol to implement consensus. The observer may not participate in voting; instead, it synchronizes requests from the leader to implement replica consistency. A leader-based approach may provide linearizable write and sequential read semantics. Read operations may be performed locally and write operations may be proposed and queued by the leader to provide a total order. The localized read operations may increase performance but may break the ability of the coordination service to compose cleanly while maintaining consistency. Thus, a client concurrently accessing two loosely-coupled coordination services clusters may see inconsistent states.

In a leader-based approach, a learner may not participate in the voting phase. However, in coordination services, such as ZooKeeper™, the learner may be a superclass of the follower and observer. In other words, the follower is a learner but participates in voting. The observer may be similar in both a leader-based approached and in coordination services. Thus, as used herein, the term "learner" may be referred to as a non-voting observer. As used herein, sequential consistency across data centers is referred to as "global sequential consistency."

Figure 1B:
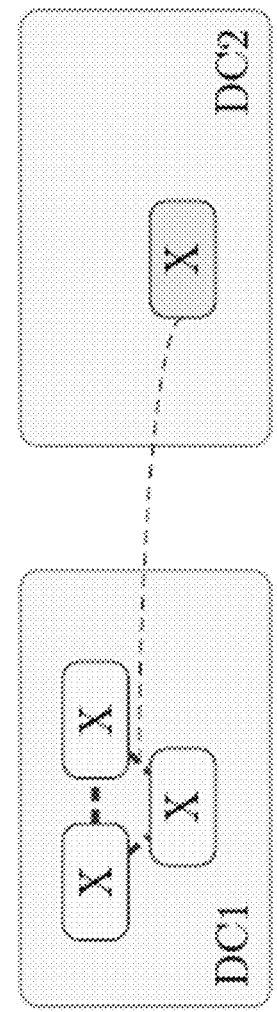

Referring now to FIG. 1A and FIG. 1B, depicted are example implementations for global coordination. Coordination across geographical regions incurs significant costs due to increased latency. There are several alternatives to deploying a distributed application across regions. A naïve deployment 60 involves spreading a coordination cluster across data centers (DC1 and DC2), as depicted in FIG. 1A. An object set, x, is replicated in all instances. A state machine replication (SMR) protocol may run between the geographically distributed replicas, and the already expensive voting process may incur additional network delays and increase the likelihood of network partitions. In some arrangements, conflicts may rise when updates are made in DC1 and DC2 simultaneously. For example, if X in DC1 and X in DC2 receive an update simultaneously, a costly voting process may occur. An optimized deployment 150 is shown in FIG. 1B. In this setting, the coordination service may run at/in/on a single data center (DC1 in FIG. 1B). A learner (observer) deployed in a different data center (e.g., DC2) may synchronize requests from the primary data center. This deployment avoids the costly voting process between data centers but introduces a performance bottleneck at the DC1 leader since all write requests may be directed to DC1. Either approach may have performance characteristics which have drawbacks.

Figure 2:
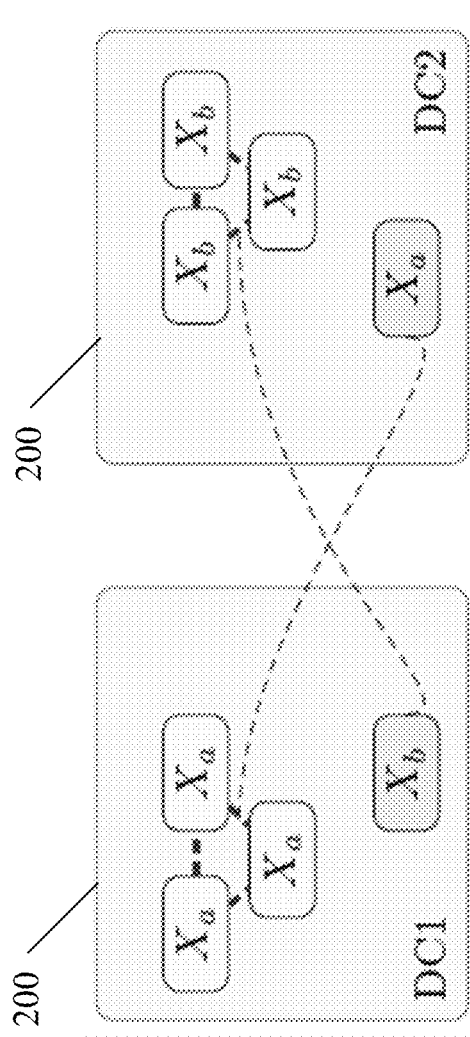
FIG. 2 is an example implementation for global coordination using a partitioned deployment.

Referring now to FIG. 2, depicted is an example implementation for global coordination using a partitioned deployment. For example, instead of using a single coordination service, an alternative is to partition the data into multiple data partitions as illustrated in FIG. 2. In the deployment shown in FIG. 2, the data centers may run multiple coordination services independently in each partition. For example, in FIG. 2, the object X may be partitioned into two objects, $X_a$ and $X_b$, and placed $X_a$ in DC1 and $X_b$ in DC2. To achieve higher performance, an observer may be deployed at each data center to observe the related data. However, such a deployment and arrangement may lead to an inconsistency issue (referred to as "composition staleness" problem) depicted in FIG. 3 (which is a timing diagram 300 showing a composition staleness). The composition staleness shown in FIG. 3 demonstrates that sequential consistency is not composable in a partitioned environment. For example, client 1 writes $X_a$, then reads an old value of zero for object $X_b$. Meanwhile, client 2 writes object $X_b$, then reads an old value of zero for object $X_a$. Each coordination service maintains its consistency guarantees, but there is no equivalent sequential execution order for these two clients.

Other extensions of ZooKeeper™, such as WanKeeper, may use a hierarchical broker to manage tokens for global coordination, which provides linearizability per client and linearizability per object. However, solutions only provides causal consistency in the context of the composition staleness problem. Other solutions may use a clock-based system to coordinate across globally partitioned objects. Such algorithms may employ lease-based locking between partitions to provides correct ordering. However, algorithms may sacrifice performance. Other solutions may provide a new consistency model called "RedBlue consistency," which allows users to specify consistency requirements at the level of individual operations. Such solutions may allow a mixture of weak and strong consistency guarantees within a single application.

Section C. Systems and Methods for a Consistent Propagatable Partition Tree

Figure 4:
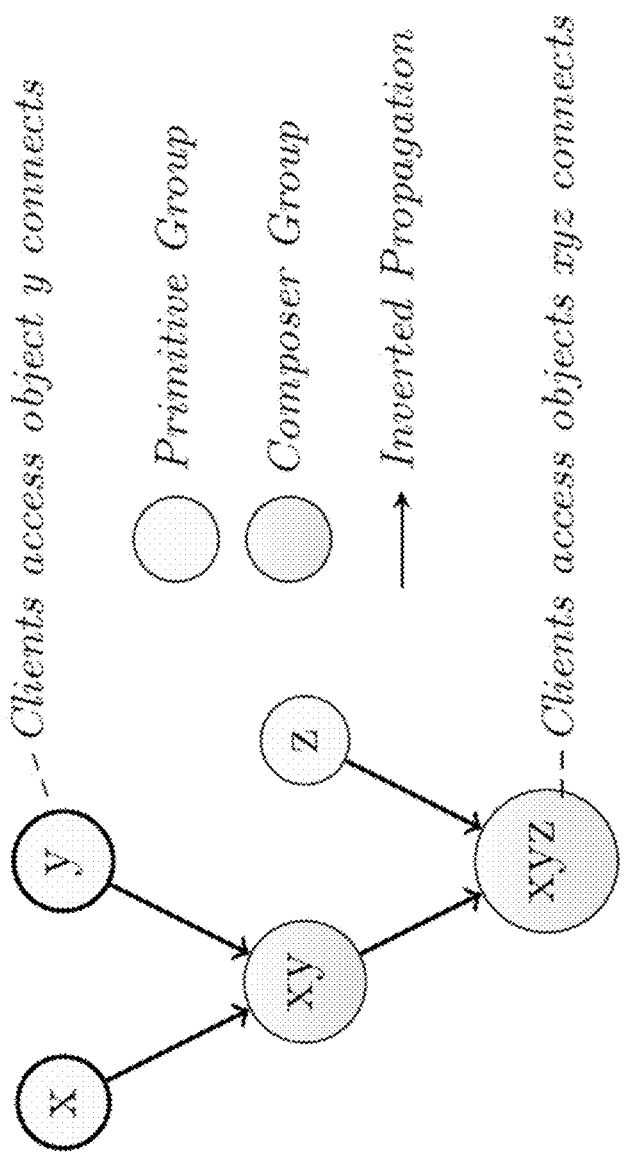
FIG. 4 is an example of a consistent propagatable partition (CoPPar) tree, according to an example implementation of the present disclosure.

Referring now to FIG. 4, depicted is an example of a consistent propagatable partition (CoPPar) tree 400, according to an example implementation of the present disclosure. In the example CoPPar tree 400 illustrated in FIG. 4, each node in the tree may represent a set of processes that maintain the consistency requirements of the same partitioned objects. The tree nodes x, y, z are primitive groups and xy, xyz are composer groups. As such, the CoPPar Tree 400 may be or include a distributed tree structure that maintains global sequential consistency, by properly composing the commit order between nodes which are themselves sequentially consistent. Each node may constitute a group of processes, all of which satisfy a particular consistency level required by clients.

A partition may be or include a subdivision of a domain (a set of objects) into disjoint subsets. The CoPPar tree 400 may be implemented such that two partitions are disjoint. For example, if p and q are partitions, the CoPPar tree 400 may be implemented such that p and q are disjoint, if an only if (e.g., iff) p is not a subset of q and q is not a subset of p. Such an implementation implies that no objects are shared between partitions (also referred to as "disjoint restriction"). As used herein, "peer" may refer to as a process, and "group" may refer to a collection of processes. All peers within a group may maintain the same set of objects. Groups may form a hierarchical inverted tree, with leaf groups at the top and the root group at the bottom. The CoPPar Tree 400 may use inverted propagation to transmit requests through the tree (e.g., messages may be propagated from the leaf groups to the root groups). In FIG. 4, the objects xyz may be partitioned into two smaller objects, xy and z. The object xy may be partitioned further into x and y. Each node in the tree may represent a group of processes that maintains the same partitioned objects. The term primitive may be used herein to describe a node at the top (leaf) of the inverted tree structure. Thus, the data in a partition managed by a primitive group may not be subdivided. A composer may aggregate requests from multiple partitions and order those requests. Thus, multiple composers may be deployed in different data centers for the same partitioned objects as a composer group. Furthermore, the objects partitioned objects in the compose group may be subdivided. The CoPPar Tree 400 can be generated based on the primitive group and the composer group.

Figure 3:
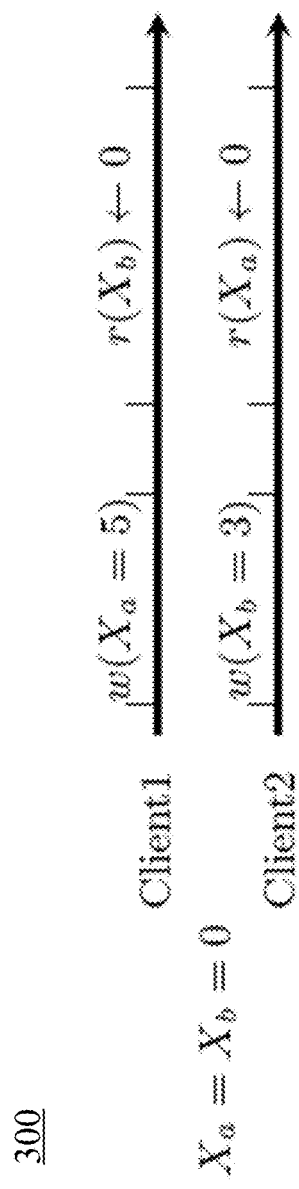
FIG. 3 illustrates an example of composition staleness.
Figure 5:
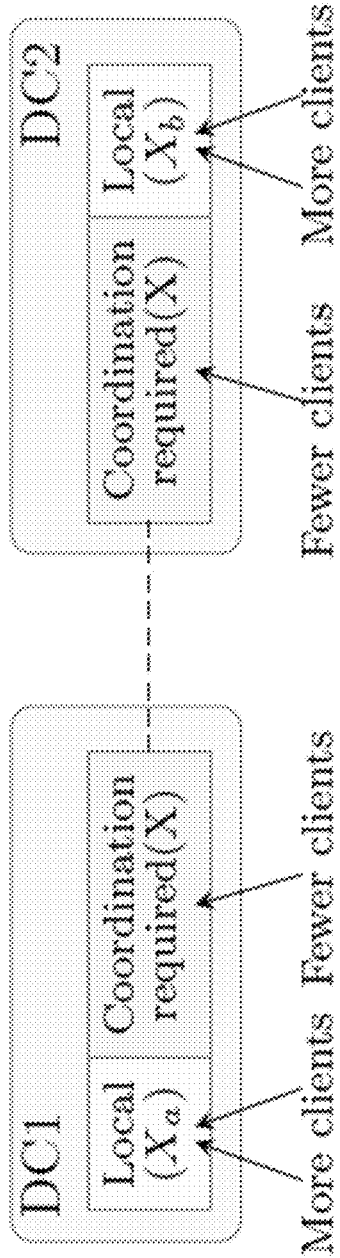
FIG. 5 is an example grouping for a global order and local order for two datacenters, according to an example implementation of the present disclosure.

At a high level, CoPPar Tree 400 global sequential consistency by composing the write order between sequentially consistent nodes. Each data center 200 maintains a partial view of the tree to enable local reads (only needing to visit a single replica) and data-center level local writes (voting within the data center, without requiring voting across data centers). The CoPPar Tree 400 uses write order combination to achieve high performance and enable replication systems to independently commit writes. A composition order cycle may occur when two clients concurrently execute operations on data across multiple partitions. In such situations, there may be no global write order between these clients. For example, Client 1 may observe Xa=5 before Xb=3, whereas Client 2 may observe the opposite as seen in FIG. 3. However, not all clients generate requests spanning across data centers. For example, a client accessing only Xa does not require global coordination as seen in FIG. 5. Specifically, FIG. 5 depicts an example 500 grouping for a global order and local order for two datacenters. The clients may be separated into local clients (e.g., $X_a$) and coordinated clients (e.g., X). Coordinated clients may correspond to a global order or a local order amongst data centers 200. Local clients can execute operations concurrently on their local partition for better performance. This approach completely decoupled for independent coordination services and the coordinated clients do not negatively impact local clients.

Figure 6:
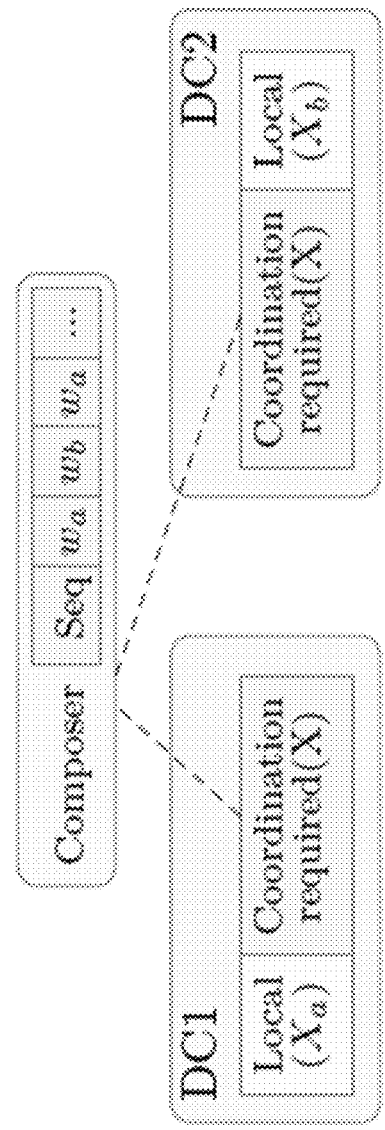
FIG. 6 is an example of a composer sequence for two datacenters, according to an example implementation of the present disclosure.

In some arrangements, the composition order cycle may arise when there is no global order imposed on writes spanning two sequential systems, resulting in the lack of a sequential history between them. To address this, a sequencer can be introduced to establish a global write order for clients who require cross-partition coordination. FIG. 6 depicts an example 600 of a composer sequence for two datacenters. Clients access this sequencer (also referred to as the composer) to achieve a unified sequential history. In some arrangements, composition order cycle may be referred to as compose ordering.

Figure 7:
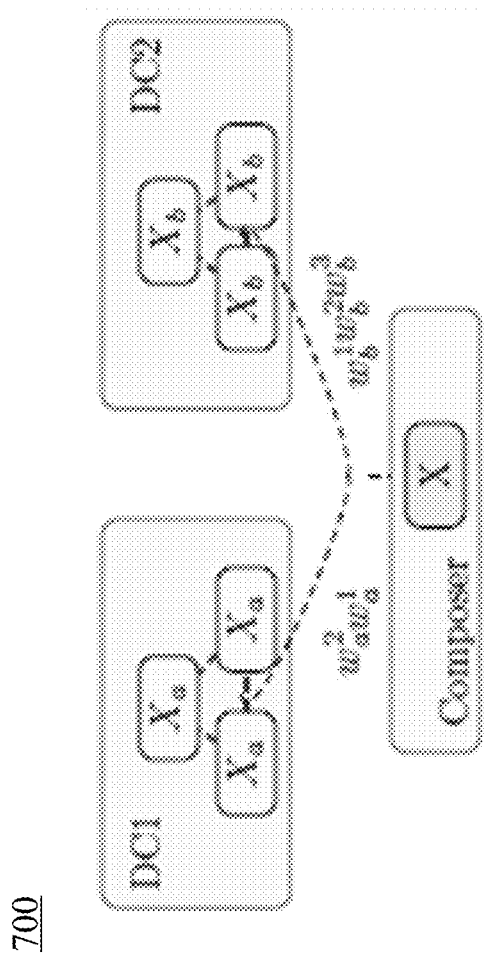
FIG. 7 is an example an example of compose ordering for a set of two objects that is partitioned across two data centers, according to an example implementation of the present disclosure.

With compose ordering and client grouping, coordination may be performed as needed. Therefore, in this approach, the systems and methods described herein may provide a partial order for clients, which may not use or implement coordination, and a total order for clients, which may use or implement coordination. FIG. 7 depicts an example 700 of compose ordering for a set of two objects partitioned across two data centers. A request γ is an operation to a data partition and can include either a read (r) request or a write (w) request. A write request, referred to as $w_p^k$, may denote the $k^{th}$ write to partition p, where the order is determined by the coordination service. A commit c may be or include a message from the leader that instructs the follower to make a write request durable. In example 700, each data center 200 independently commits writes to partition $X_a$ and $X_b$ as $w_a^1 w_a^2$ and $w_b^1 w_b^2 w_b^3$ respectively. The composer can combine these committed writes into a global order (e.g., $w_a^1 w_a^2 w_b^1 w_b^2 w_b^3$). The inverted propagation in CoPPar Tree allows a lazy order for requests across partitions. With this lazy order, a single partition need not wait to coordinate with another partition, allowing it to perform writes locally.

Figure 8:
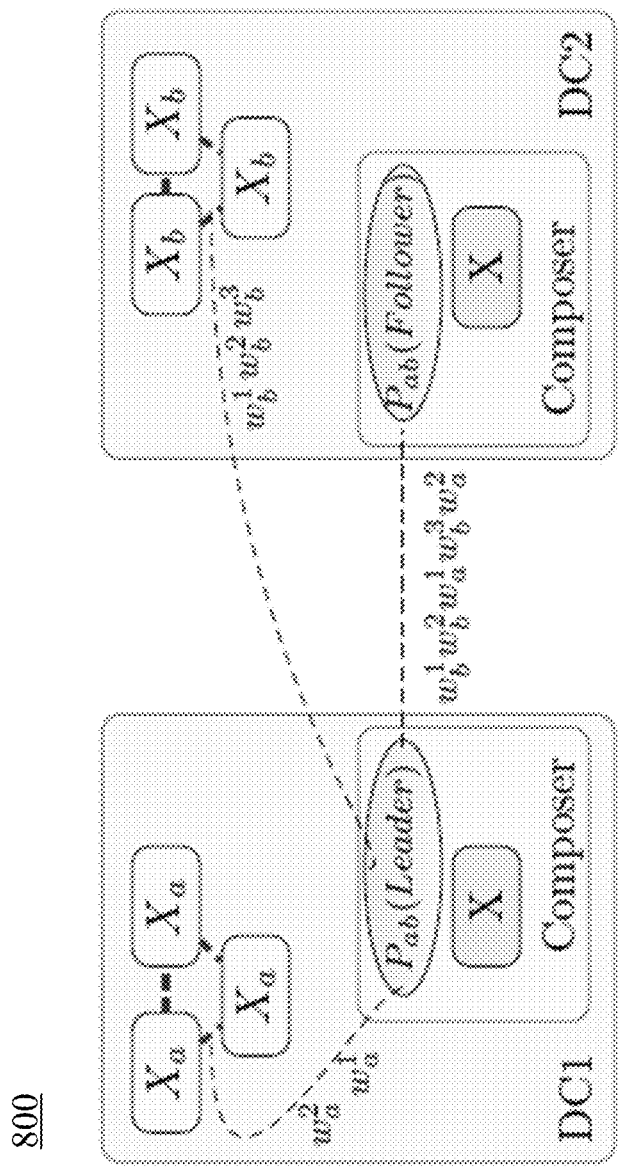
FIG. 8 is an example of a leader and follower for two datacenters, according to an example implementation of the present disclosure.
Figure 9:
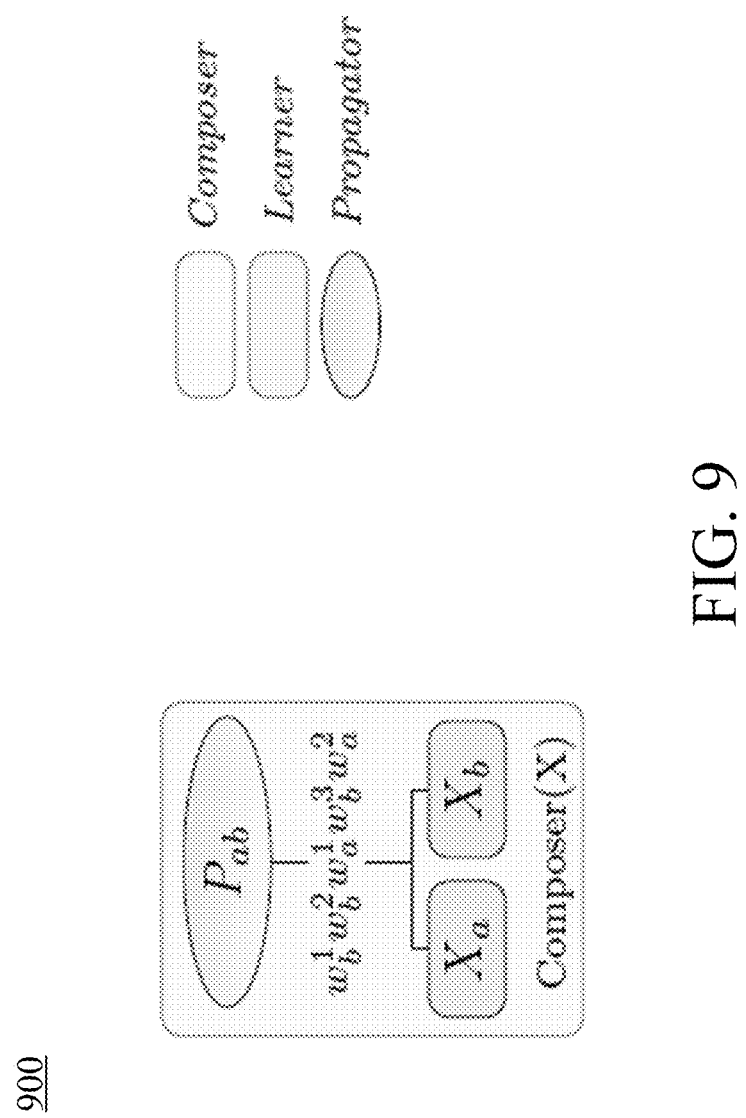
FIG. 9 is an example scheme for a composer, a learner, and a propagator, according to an example implementation of the present disclosure.

In some embodiments, propagators may be arranged in a leader-follower arrangement. Specifically, FIG. 8 depicts an example 800 of a leader and follower for two datacenters, according to an example implementation of the present disclosure. In the example shown in FIG. 8, a propagator at the first datacenter (DC1) may disseminate the write order to the follower at the second data center (DC2). A scheme with a single centralized composer may cause a performance bottleneck, which may be prone to failures. Replicated composers may be used to overcome this technical shortcoming. To maintain a consistent write order between composer replicas, the systems and methods described herein may include a plurality of propagator components, one of which acts as the leader. Other propagators (or propagator components) may act as followers and accept the composed global write order from the leader. FIG. 9. depicts an example 900 of a decentralized composer scheme, according to an example implementation of the present disclosure. In the example of FIG. 9, each learner may be associated with a single partition, and accept commits based on the order from the propagator. As shown, the systems and methods described herein may be configured to independently store and commit partitioned objects, within a composer based on partitions. The propagator can be configured to control the write order commits, and multiple learners can be configured to independently learn those write orders from the propagator. Using this approach, the CoPPar tree 400 may enhance modularity and scalability of the composer to improve performance of the distributed processing system.

Figure 14:
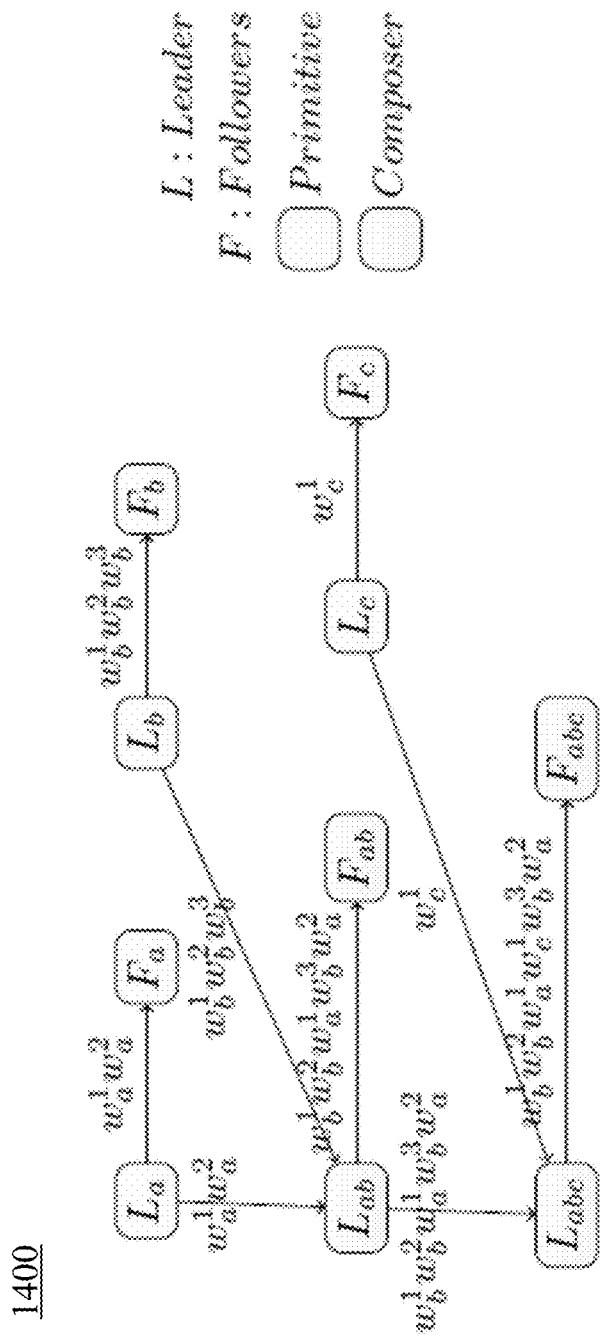
FIG. 14 is an example of a write order broadcast (WOB) in the CoPPar tree, according to an example implementation of the present disclosure.

In various embodiments, to propagate the CoPPar tree 400, the systems and methods described herein may use a write order broadcast mechanism, as shown in FIG. 14. Specifically, FIG. 14 shows an example 1400 write order broadcast (WOB). When composers belong to the same consistency group, the write order may be broadcast from their associated propagator leader. For composers in different groups, the write order flows from child to parent down the inverted tree.

Figure 10:
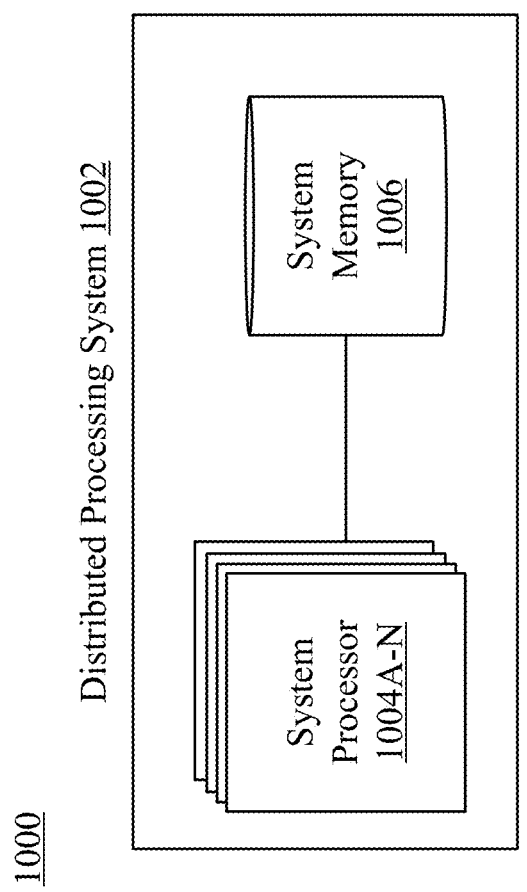
FIG. 10 is an example system to implement the CoPPar tree, according to an example implementation of the present disclosure.

Referring now to FIG. 10 depicts an example system 1000 to implement the CoPPar tree. The system 1000 may include a distributed processing system 1002. The data processing system 102 can include a physical computer system operatively coupled or that can be coupled with one or more components of the system 100, either directly or through an intermediate computing device or system. The data processing system 102 can include a virtual computing system, an operating system, and a communication bus to effect communication and processing. The data processing system 1002 can include system processor 1004A-N (referred to as system processor 1004 herein) and memory 1006.

The system processor 1004 can execute one or more instructions associated with the system 1000. The system processor 1004 can include one or more electronic processors, integrated circuits, or the like including one or more of digital logic, analog logic, digital sensors, analog sensors, communication buses, volatile memory, nonvolatile memory, and the like. The system processor 1004 can include, but is not limited to, at least one microcontroller unit (MCU), microprocessor unit (MPU), central processing unit (CPU), graphics processing unit (GPU), physics processing unit (PPU), embedded controller (EC), or the like. The system processor 1004 can include a memory operable to store or storing one or more instructions for operating components of the system processor 1004 and operating components operably coupled to the system processor 1004. For example, the one or more instructions can include one or more of firmware, software, hardware, operating systems, embedded operating systems. The system processor 1004 or the system 1000 generally can include one or more communication bus controller to effect communication between the system processor 1004 and the other elements of the system 1000.

The system processor 1004 may maintain the CoPPar Tree 400 and may generate a plurality of nodes to correspond to the primitive groups and the composer groups. In some arrangements, the plurality of nodes are associated with a plurality of commit requests in the distributed processing system 1002. For example, the system processor 1004 can generate a node ABC in a composer group. The system processor 1004 may subdivide the node ABC (or XYZ of FIG. 4) to be AB and C. The system processor 1004 may further subdivide AB to be A and B. Thus, A, B, and C are in primitive groups respectively. It is to be understood that node ABC can be subdivided into AB and C, AC and B, or BC and A to obtain the same primitive groups A, B, C.

The system processor 1004 may receive a plurality of write requests for a data item. The plurality of write requests may include at least one of an INSERT operation, UPDATE operation, DELETE operation, User registration, or Inventory management, among others. For example, a write request can include an INSERT operation. The INSERT operation may state, INSERT INTO Customers (CustomerID, FirstName, LastName, Email)
  VALUES ('101', 'John', 'Doe', 'john.doe@example.com').

In another example, a write request can include an UPDATE operation. The UPDATE operation may state, UPDATE Products
SET Price = 110.1010
WHERE ProductID = 'P123'.

Each write request in the plurality of write request correspond to a process in the distributed processing system 1002. For example, an INSERT operation can correspond to process A, an UPDATE operation can correspond to process B in the distributed system 1002. The system processor 1004 may form a composer group with AB then subdivide the composer group into one primitive group with A and another primitive group with B.

The system memory 1006 can store data associated with the system 1000. The system memory 1006 can include one or more hardware memory devices to store binary data, digital data, or the like. The system memory 1006 can include one or more electrical components, electronic components, programmable electronic components, reprogrammable electronic components, integrated circuits, semiconductor devices, flip flops, arithmetic units, or the like. The system memory 1006 can include at least one of a nonvolatile memory device, a solid-state memory device, a flash memory device, and a NAND memory device. The system memory 1006 can include one or more addressable memory regions disposed on one or more physical memory arrays. A physical memory array can include a NAND gate array disposed on, for example, at least one of a particular semiconductor device, integrated circuit device, or printed circuit board device.

The system processor 1004 may receive a plurality of read requests for a data item. The plurality of read requests may include at least one of an SELECT operation, GET operation, READ operation, Database View, or Data Analytics Query, among others. For example, a read request can include an SELECT operation. The SELECT operation may state, SELECT FirstName, Lastname, Age
FROM Customers
WHERE Counter = 'USA'

In another example, a read request can include an GET operation. The GET operation may state, GET /api/products.

Each read request in the plurality of read request correspond to a process in the distributed processing system 1002. For example, an SELECT operation can correspond to process A, an GET operation can correspond to process B in the distributed system 1002. The system processor 1004 may form a composer group with AB then subdivide the composer group into one primitive group with A and another primitive group with B.

The system memory 1006 may communicate with the system processor 1004 via a CAN bus, to store one or more CoPPar Trees 400 generated by the system processor 1004. The one or more CoPPar Trees 400 may be kept as a log in the system memory 1006. The log may track changes made to the data item in the distributed processing system 1002. For example, the system processor 1004 an UPDATE operation may change a value associated with a data item and the value change can be recorded in a log. The log may be stored in the system memory 1006 to track changes to the data item. In some arrangements, the system processor 1004 may use the log to generate the CoPPar Tree 400. For example, the system memory 1006 may store a CoPPar Tree 400 with primitive groups and composer groups. The system processor 1004 may receive read and write requests from the distributed processing system 1002 corresponding to a previously generated CoPPar Tree 400. The system processor 1004 can use the CoPPar Tree 400 stored in the system memory 1006.

The system processor 1004 may store a timestamp for each write request in the plurality of write requests and metadata associated with each write request. For example, the system processor 1004 may communicate with the system memory 1006 store the timestamp of a write request. The metadata may include a transaction ID (e.g., used to group the write requests), application ID (e.g., application which initiated the write request), operation type (e.g., INSERT, UPDATE, DELETE, among others), data version, write location, concurrency control information (e.g., use of locks, isolation levels), or security (e.g., permissions), among others. The transaction ID may indicate a group for the write request. For example, the transaction ID of a write request received by the system processor 1004 may indicate that the write request should be in a composer group within the CoPPar Tree. In some arrangements, the data version of a write request may correspond to the log in the system memory 1006. For example, the system processor 1004 may execute an UPDATE operation based on the data version of the data item associated with the write request.

The system processor 1004 may store a timestamp for each read request in the plurality of read requests and metadata associated with each read request. For example, the system processor 1004 may communicate with the system memory 1006 to store the timestamp of a read request. The metadata may include a transaction ID (e.g., used to group the read requests), application ID (e.g., application which initiated the read request), operation type (e.g., SELECT, GET, READ, among others), data version, read location, concurrency control information (e.g., use of locks, isolation levels), or security (e.g., permissions), among others. The transaction ID may indicate a group for the read request. For example, the transaction ID of a read request received by the system processor 1004 may indicate that the read request should be in a composer group within the CoPPar Tree. In some arrangements, the data version of a read request may correspond to the log in the system memory 1006. For example, the system processor 1004 may execute an SELECT operation based on the data version of the data item associated with the read request.

The system processor 1004 may determine a global order for the plurality of write requests, based on an index assigned to respective write requests of the plurality of write requests. In some arrangements, the index corresponds to the timestamp and the metadata associated with each write request. For example, a CoPPar Tree 400 may have a plurality of nodes and the system processor 1004 can use the timestamp and the metadata of each node in the plurality of nodes to determine a global order to execute the plurality of nodes, wherein the plurality of nodes correspond to the plurality of write requests. In some arrangements, the system processor 1004 may use the timestamp to determine the global order for the plurality of nodes within the CoPPar Tree 400. For example, the system processor 1004 may use the timestamp associated with each node of a CoPPar tree 400 to determine the global order.

In some arrangements, the system processor 1004 may use the metadata associated with each write request to determine the global order for the plurality of write requests. For example, the system processor 1004 may use the write location to determine the global order for the plurality of write requests, thus establishing the global order of the write request based on spatial locality. In some arrangements, the system processor 1004 may determine the global order based on the security of each write request. For example, the global order may be based on the write requests with the least number of permissions. In some arrangements, the system processor 1004 may use concurrency control information to determine the global order for the plurality of write requests. For example, the global order may be based on the write requests that provides sequential consistency.

The system processor 1004 may determine a global order for the plurality of read requests, based on an index assigned to respective read requests of the plurality of read requests. In some arrangements, the index corresponds to the timestamp and the metadata associated with each read request. For example, a CoPPar Tree 400 may have a plurality of nodes and the system processor 1004 can use the timestamp and the metadata of each node in the plurality of nodes to determine a global order to execute the plurality of nodes, wherein the plurality of nodes correspond to the plurality of read requests. In some arrangements, the system processor 1004 may use the timestamp to determine the global order for the plurality of nodes within the CoPPar Tree 400. For example, the system processor 1004 may use the timestamp associated with each node of a CoPPar tree 400 to determine the global order.

In some arrangements, the system processor 1004 may use the metadata associated with each read request to determine the global order for the plurality of read requests. For example, the system processor 1004 may use the read location to determine the global order for the plurality of read requests, thereby establishing the global order of the read request based on spatial locality. In some arrangements, the system processor 1004 may determine the global order based on the security of each read request. For example, the global order may be based on the read requests with the least number of permissions. In some arrangements, the system processor 1004 may use concurrency control information to determine the global order for the plurality of read requests. For example, the global order may be based on the read requests that may provide optimal sequential consistency.

The system processor 1004A may broadcast one or more write requests for the data item to the system processor 1004B. For example, the system processor 1004A can broadcast one or more write requests to the system processor 1004B to reveal a number of write requests to the system processor 1004B. Furthermore, the system processor 1004A may broadcast one or more read requests for the data item to the system processor 1004B. For example, the system processor 1004A can broadcast one or more read requests to the system processor 1004B to reveal a number of read requests to the system processor 1004B. It is to be appreciated that this is one example of system processor 1004A communicating with another system processor 1004B and that the communication can occur between any combination of system processors 1004A-N. The communication between the system processors 1004A-N may reveal requests received by other system processors 1004A-N in the distributed processing system 1002.

The system processor 1004 may assign the index of one or more write requests for the data item and the one or more read requests for the data item. The index may be used to determine the global order for the plurality of write requests and the plurality of read requests. In some arrangements, index may be a numerical value, a hash, full text, or a unique identifier, among others. The index may be added as a data field in the metadata of the one or more write requests or the one or more read requests. Furthermore, the index may be stored in the system memory 1006 to retrieve the corresponding read or write request. Using the index, one or more operations for the read or write requests may be ordered to determine the global order. The one or more operations correspond to the type of write request (e.g., INSERT, DELETE) and the type of read request (e.g., READ, SELECT). For example, the index assigned to each operation, the global order may be determined for the plurality of read requests and the plurality of write requests.

The system processor 1004 may generate a local order for the plurality of data centers 200 within the respective system processor 1004. The local order may include the local order for each of the plurality of data centers 200 within the system processor 1004. In some arrangements, the local order may be generated based on the timestamps of the local order for each of the plurality of data centers 200 within the system processor 1004. For example, a system processor 1004 may include a first data center 200 which includes (or receives/serves/executes) requests A, B, C, whereas a second data center 200 may include requests D, E, F. The local order of the first data center 200 may be B, A, C, or any combination thereof (based on or according to the timestamps and metadata associated with each request). The local order of the second data center 200 may be D, F, E, or any combination thereof (similarly based on or according to the timestamps and metadata associated with each request). Thus, continuing the above examples, the local order for the system processor 1004 may be D, B, A, C, F, E, or any combination thereof, based on the corresponding timestamps and metadata associated with each request.

The system processor 1004 may execute the plurality of write requests, according to the CoPPar Tree 400, based on the global order. Each node within the CoPPar Tree 400 corresponds to a write request. The global order may define the order of execution for each node within the CoPPar Tree 400. For example, the leaf nodes of a CoPPar tree 400 may include A, B, and C. The global order may be B, A, C. Thus, the system processor 1004 may execute node b, node A, then node C. The system processor 1004 may execute the plurality of read requests, according to the CoPPar Tree 400, based on the global order. Each node within the CoPPar Tree 400 corresponds to a read request. The global order may define the order of execution for each node within the CoPPar Tree 400. For example, the leaf nodes of a CoPPar tree 400 may include A, B, and C. The global order may be B, A, C. Thus, the system processor 1004 may execute node b, node A, then node C.

The system processor 1004 may propagate the CoPPar Tree 400 based on a first composition or a second composition. To propagate the CoPPar Tree 400, the system processor 1004 may impose a queue using a first-in-first-out (FIFO) order on commit messages received from different partitions based in the arrival time of the commit messages to sort the first and second write request. The different partitions can be observed in FIG. 4. For example, the requests received may be A, B, C, D, E, where A is the first commit message. The system processor 1004 may impose a queue with elements ordered A, B, C, D, E.

The first composition may be referred to as a simplex composition. The system processor 1004 executing the simplex composition may block a first commit message based on the FIFO queue and execute a second commit message before executing the first commit message. The second composition may be referred to as a duplex composition. The system processor 1004 executing the duplex composition may receive one or more commit messages by a leader. The leader may record an order for the one or more commit messages. The system processor 1004 may execute the one or more commit messages based on the order recorded by the leader.

Figure 11:
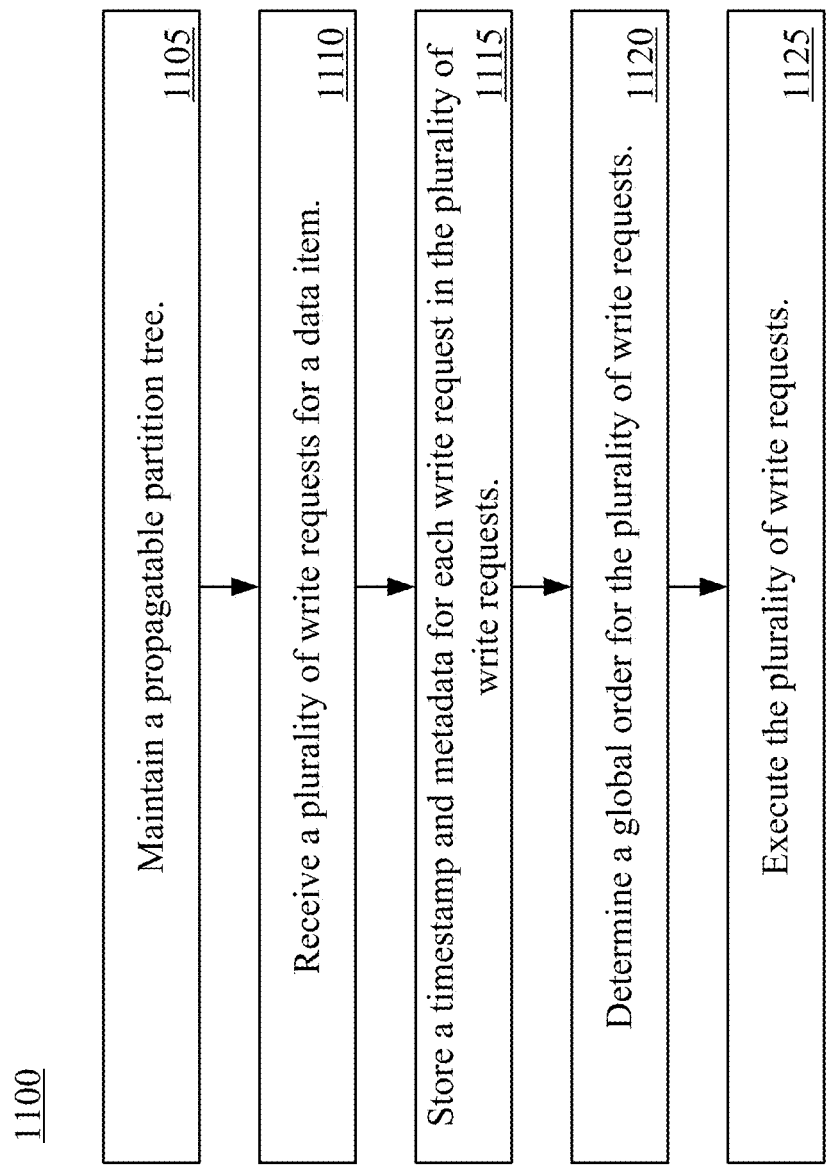
FIG. 11 is an example method to execute the CoPPar tree, according to an example implementation of the present disclosure.

Referring now to FIG. 11, a flowchart for a method 1100 to execute the CoPPar tree 400 (of FIG. 4) in accordance with present implementations. The example system 1000 can perform method 1100 according to present implementations. It is to be appreciated that additional, fewer, or different operations (e.g., steps, sub steps, etc.) than what is described herein may be performed depending on the particular arrangement. In some embodiments, some, or all operations of method 1100 may be performed by one or more processors executing on one or more computing devices, systems, or servers. In various embodiments, each operation may be re-ordered, added, removed, or repeated.

At step 1105, one or more processors (e.g., system processors 1004A-N) may maintain a propagatable partition tree (e.g., CoPPar Tree 400) where the propagatable partition tree is a distributed inverted tree structure. The propagatable partition tree may include a plurality of nodes which correspond to a group of one or more processes and determines the commit order between each of the plurality of nodes. The groups of one or more processes include a plurality of primitive groups and a plurality of composer groups. The one or more processors may use inverse propagation to transmit requests through the propagatable partition tree.

At step 1110, the one or more processors may receive a plurality of requests (e.g., read requests, write requests) for a data item. The plurality of requests may be sent by another processor or by a computing system (e.g., distributed processing system 1002). At step 1115, the one or more processors may store (e.g., in system memory 1004) a timestamp for each request in the plurality of request and metadata associated with each write request. The metadata may include a transaction ID, application ID, operation type (e.g., SELECT, GET, READ, INSERT, among others), data version, location, concurrency control information (e.g., use of locks, isolation levels), and security (e.g., permissions), among others.

At step 1120, the one or more processors may determine a global order for the plurality of requests, based on an index assigned to respective requests of the plurality of requests. A first processor may broadcast a first write request and second write request for the data item to a second processor. The second processor may broadcast a first read request and a second read request for the data item to the first processor. The one or more processors may assign the index of the first write request for the data item, the second write request for the data item, the first read request for the data item, and the second read request for the data item. The index may correspond to the timestamp and the metadata associated with each request.

The one or more processors may order one or more operations based on the index assigned to the respective requests. The one or more operations including the first write request, the first read request, the second write request, and the second read request. The one or more processors may determine a first local order for the one or more operations of a first data center (e.g., data center 200) and determine a second local order for the one or more operations of a second data center. the one or more processors may further generate a local order for the one or more operations of the first data center and second data center, based on the first local order and the second local order.

At step 1125, the one or more processors may execute the plurality of requests. The one or more processors may execute the plurality of requests, based on or according to the various orders described herein. For example, the one or more processors may execute the plurality of requests according to the first (and second) local order. The one or more processors may execute the plurality of read and write requests. The one or more processors may execute the plurality of requests, to provide sequential consistency. The one or more processors may execute the plurality of requests by propagating the CoPPar tree.

Figure 12:
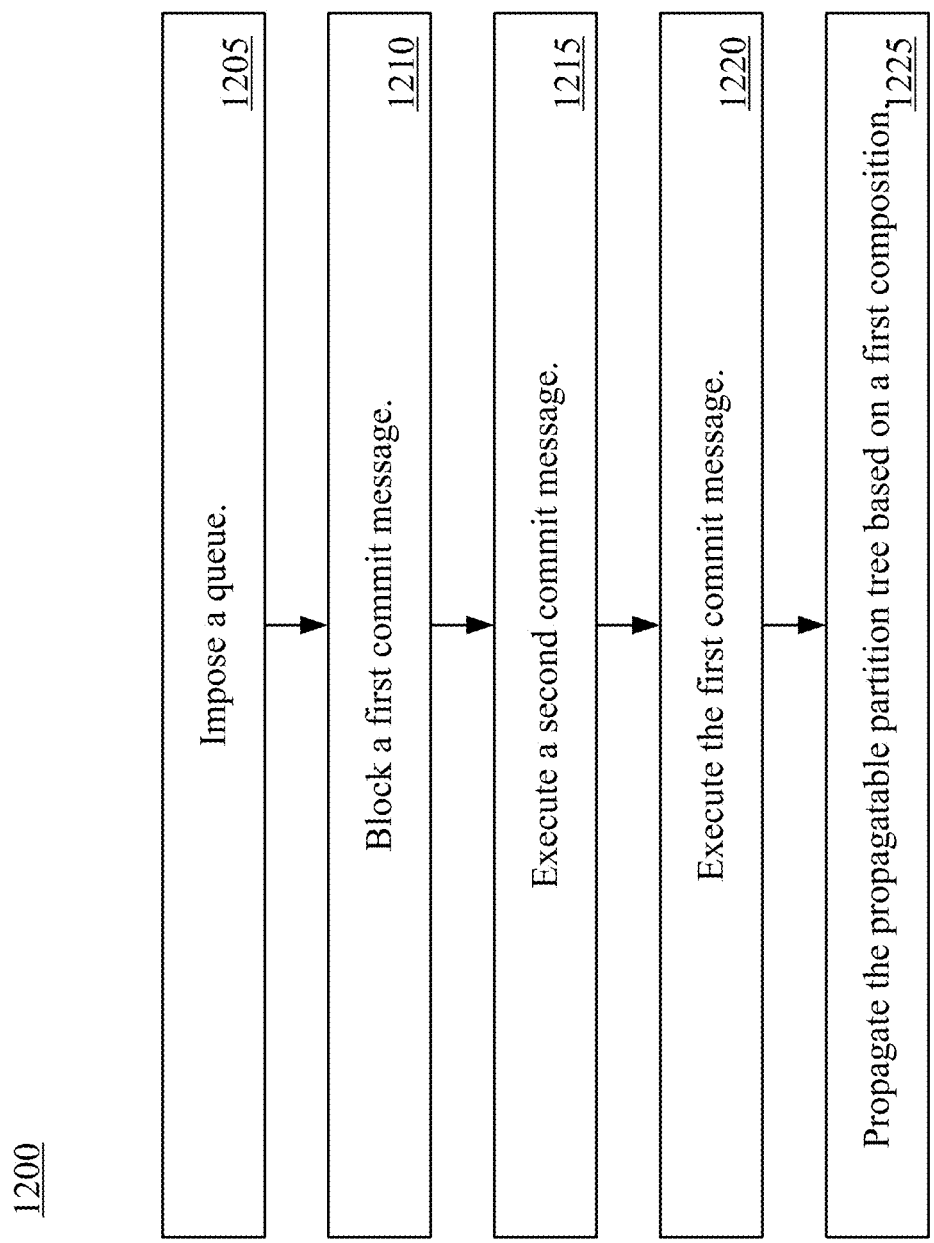
FIG. 12 is an example method to execute a simplex propagation, according to an example implementation of the present disclosure.

Referring now to FIG. 12, a flowchart for a method 1200 to propagate a propagatable partition tree (e.g., CoPPar Tree 400) based a first composition in accordance with present implementations. The example system 1000 can perform method 1200 according to present implementations. It is to be appreciated that additional, fewer, or different operations (e.g., steps, sub steps, etc.) than what is described herein may be performed depending on the particular arrangement. In some embodiments, some, or all operations of method 1200 may be performed by one or more processors (e.g., system processor 504) executing on one or more computing devices, systems, or servers (e.g., distributed system 502). In various embodiments, each operation may be re-ordered, added, removed, or repeated.

At step 1205, the one or more processors may impose a queue. In some embodiments, the one or more processors may impose a queue, using a first-in-first-out (FIFO) on commit messages receive from different partitions, based on an arrival time of the commit messages to sort a first write request and second write request. At step 1210, the one or more processors may block, a first commit message based on the order of messages in the FIFO queue. At step 1215, the one or more processors may execute a second commit message based on the order of messages in the FIFO queue. At step 1220, the one or more processors may execute the first commit message based on the order of messages in the FIFO queue.

Figure 15A:
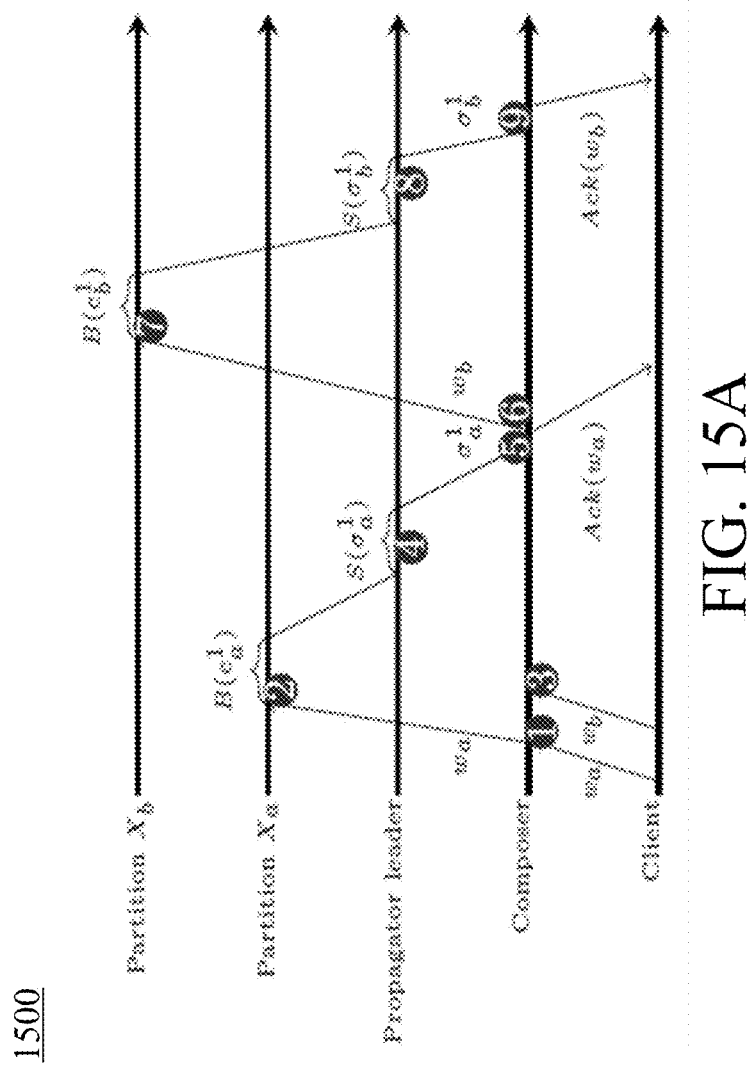
FIG. 15A-FIG. 15B illustrate an example implementation of the simplex and duplex propagation, respectively, based on two asynchronous write requests from different partitions.

At step 1225, the one or more processors may propagate the propagatable partition tree based on a first composition where the first composition is the simplex propagation. Referring to FIG. 15A, depicted is an example implementation of the simplex propagation 1500 based on two asynchronous write requests from different partitions. In FIG. 15A, the propagation algorithms are illustrated with two write requests $w_x w_y$, and use "B" to denote a broadcast and "S" to denote a sort. The sorting phase in simplex propagation may impose a first-in-first-out (FIFO) order on commit messages received from different partitions, based on the commit messages' arrival. In simplex propagation, the write request from the client may be directly sent to the primitive leader. In FIG. 15A, the composer peer may receive two write requests $w_x$ $w_y$ from the same client in steps 1 and 3, respectively. The composer peer may send the $w_x$ request directly to the primitive leader X from steps 1 to 2. However, since the sorting phase uses a FIFO queue, in the session part, the system may block the $w_y$ request in step 3, so that steps 4 and 8 follow the client order. The steps 1 to 3 is an entire double-confirmed commit of $w_x$ and steps 6 to 9 is a double-confirmed commit of $w_y$. The systems and methods may allow concurrent execution of the same partition but use synchronized execution for requests to access different partitions. A simplex session algorithm is provided in algorithm 1 below.

---

Algorithm 1 Simplex session implements session interface

```
1:  requests ← Queue              ▷ A queue for all requests
2:  partitions ← Queue            ▷ A queue for all pending partitions
3:  outstanding ← 0               ▷ A counter for current partition
4:  procedure startRequest(req)
9:      requests.enqueue(req)
6:      isFirst ← false
7:      if partitions is empty or req.partition /= partitions.last( ) then
8:          partitions.enqueue(req.partition)
9:          isFirst ← true
10:     end if
11:     if partitions.len = 1 then
12:         flushRequests(req.partition)
13:     else if isFirst and outstanding = 0 and requests.peek( ) = req then
14:         partitions.dequeue( )
19:         flushRequests(req.partition)
16:     end if
17: procedure doneRequest(req)
18:     outstanding ← outstanding − 1
19:     if outstanding = 0 and requests not empty then
20:         partitions.dequeue( )
21:         flushRequests(requests.peek( ).partition)
22:     end if
23:     respondClient(req)
24: procedure flushRequests(p)    ▷ Submit first partition requests
29:     while requests.peek( ).partition = p do
26:         outstanding ← outstanding + 1
27:         submitRequest(requests.dequeue( ))
```

---

The simplex session may use a partition queue, such that the requests are executed in the correct order. A request from the client may invoke the procedure of startRequest. Lines 6 to 10 indicate whether the request differs from the previous request partition. If so, the algorithm enqueues to the request the partition queue. Lines 11 to 16 indicate two conditions for submitting requests in the first partition queue: (1) No other partition requests are in the queue or (2) the request is the first item in the request queue, and no outstanding unfinished request exists. After the data observer commits the request, the doneRequest procedure is invoked. Lines 19 to 22 may try to switch partition if the first partition requests are finished. From lines 24 to line 27, the flushRequests procedure is a loop to submit all requests belonging to the first partition in the partition queue. The outstanding counter for finished requests is increased in line 26 and decreased in line 18. The partitions queue in the simplex algorithm provide that, when there are two consecutive partition requests, the second may be blocked.

Figure 13:
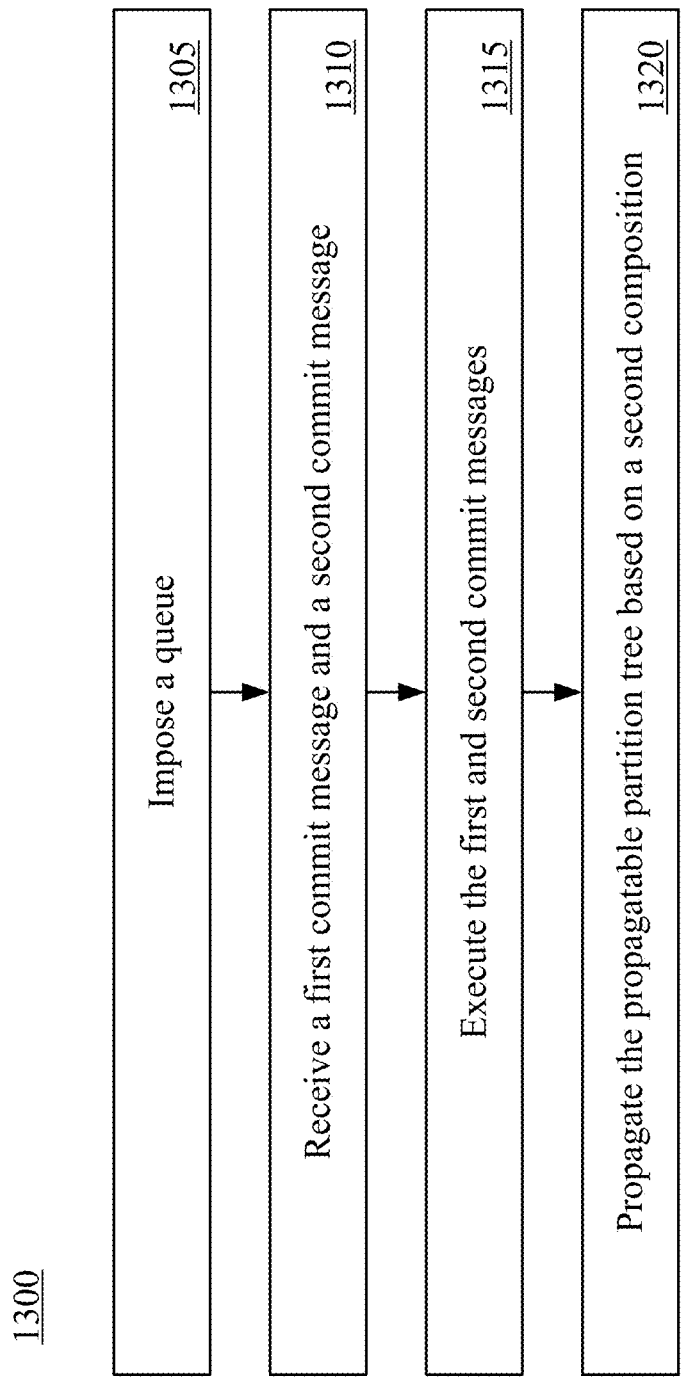
FIG. 13 is an example method to execute a duplex propagation, according to an example implementation of the present disclosure.

Referring now to FIG. 13, a flowchart for a method 1300 to propagate a propagatable partition tree (e.g., CoPPar Tree 400) based a second composition in accordance with present implementations. The example system 1000 can perform method 1300 according to present implementations. It is to be appreciated that additional, fewer, or different operations (e.g., steps, sub steps, etc.) than what is described herein may be performed depending on the particular arrangement. In some embodiments, some, or all operations of method 1300 may be performed by one or more processors executing on one or more computing devices, systems, or servers. In various embodiments, each operation may be re-ordered, added, removed, or repeated.

At step 1305, the one or more processors may impose a queue using a first-in-first-out (FIFO) on commit messages receive from different partitions based on an arrival time of the commit messages to sort a first write request and second write request. At step 1310, the one or more processors may receive, a first commit message and a second commit message, by a leader. The leader may record an order for the first commit message and a second commit message, based on the FIFO queue. At step 1315, the one or more processors may execute the first commit message and the second commit message based on the order recorded by the leader.

Figure 15B:
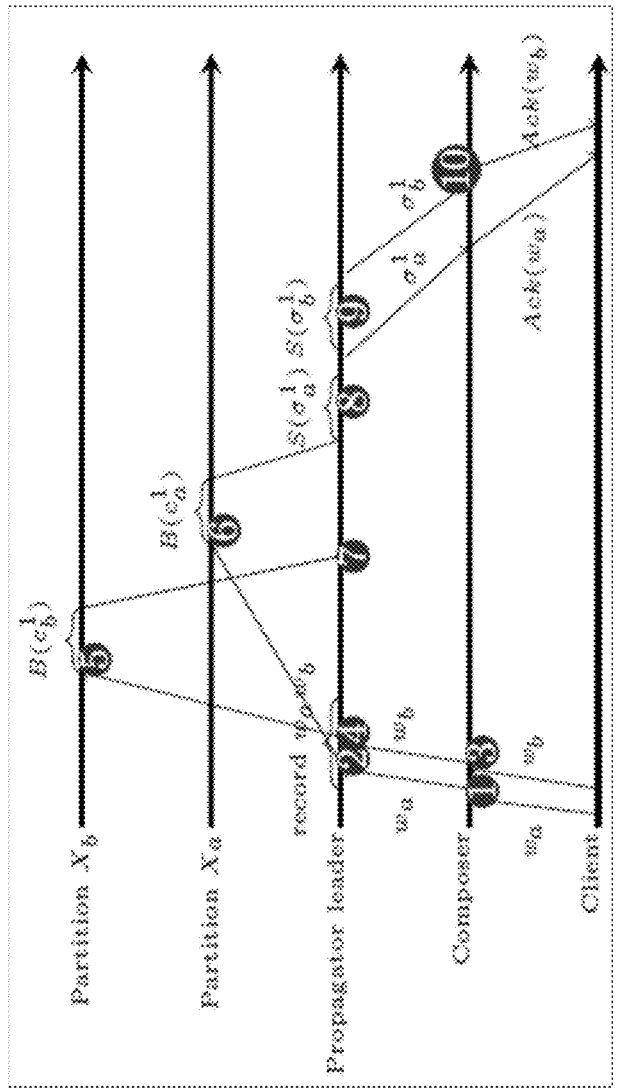

At step 1320, the one or more processors may propagate the propagatable partition tree based on a second composition where the second composition is the duplex propagation. Referring to FIG. 15B, depicted is an example implementation of the duplex propagation 1550 based on two asynchronous write requests from different partitions. In FIG. 15B, the propagation algorithms are illustrated with two write requests $w_x w_y$, and use "B" to denote a broadcast and "S" to denote a sort.

In duplex propagation, shown in FIG. 15B, the sorting phase may record the order of the initial requests. The session phase may allow concurrent execution for any requests that art partition agnostic. As shown in FIG. 15B, instead of sending requests to the primitive leader, the requests may instead be sent to the propagator leader. The propagator leader may record the order of the initial requests $\gamma_x \gamma_y$ in steps 2 and 4. The composer peer may make the request submission in steps 2 to 6 and steps 4 to 5. Due to concurrent execution, the composer peer may receive the request $w_y$ first in step 7. However, since the initial request information is maintained, the system may wait to receive the request $w_x$, then create the order oxy in steps 8 and 9. Duplex propagation may have an order contradiction in read requests. For example, two read requests that access different partitions may be initialized as $\gamma_1 \gamma_2$ but returned as $\gamma_2 \gamma_1$. However, we can simply reorder this to $\gamma_1 \gamma_2$. There are two reasons this is correct: First, $\gamma_2$ would not read a value $v_2$ before $\gamma_1$'s read $v_1$ because we have a linearizable write order of $v_1 v_2$ between all partitions. Second, the order of $\gamma_2 \gamma_1$ is because of the concurrent read in the composer peer. From the previous reason, we know $\gamma_2$ takes effect after $\gamma_1$. Therefore, reordering the requests as $\gamma_1 \gamma_2$ is correct. A duplex session algorithm is illustrated in algorithm 2 and algorithm 3 below.

| Algorithm 3 Duplex sorting in propagator leader |
|---|
| 8:    else |
| 9:      propagateFollowers (req) |
| 10:   while record.peek ( ) in pending do |
| 11:      propagateFollowers (req) |
| 12:   end if |

Due to concurrent execution, both the duplex sorting phase and duplex session use a hashmap, to provide that requests are executed in the correct order. In the duplex sorting phase (Algorithm 3), lines 3 to 4 records the request order, which may be invoked by the leader or forwarded from a follower. Lines 5 to 12 (of Algorithm 3) show the propagate procedure based on the request order, invoked when learning a request from each corresponding partition. In the duplex session phase (Algorithm 2), since the composer containing a propagator leader also tracks the session, the systems and methods described herein may use a boolean variable, isLearnedFromFollower, to identify whether the request is submitted by a follower. Lines 6 to 8 (e.g., of Algorithm 2) show the forward message to the propagator leader so that it can record the request order. After the related partition commits the request, the done Request procedure is invoked. However, as mentioned above, an order contradiction may occur. Thus, the systems and methods described herein may use a map to track the finished requests. In lines 10 through 19, responses are sent to all completed requests from the client.

In various implementations, the systems and methods described herein may provide isolated cross group access for a client to change its group (e.g., where a client needs to access a partitioned object that does not belong to current group). This mechanism can be implemented on the server or client side. The isolated cross group access includes upgrade and downgrade functions, which hold sequential consistency across groups.

To provide an upgrade function, a client that belongs to group $G_p$ may upgrade its group, if it requests to access partition q, if q is not subset of p. It is possible to have order contradiction if we do not have any restrictions. For example, due to inverted propagation, a group $G_{xy}$ holds σ order $\sigma^1 \sigma^1 \sigma^2$, and the a primitive group $G_x$ committed $c^1 c^2 c^3$, a client from $G_x$ with $w_x^3 r_x$ may read $w^1$ in the group

| Algorithm 2 Duplex session implements session interface |
|---|
| 1:   requests ← Queue         ▷ A queue for all requests |
| 2:   finished ← Map            ▷ A map for finished requests |
| 3:   isLearnedFromFollower ← false   ▷ Whether request is from follower |
| 4:   procedure startRequest(req) |
| 9:      requests.enqueue(req) |
| 6:      if isLearnedFromFollower = false then |
| 7:         forwardRequestToPropagatorLeader(req) |
| 8:      end if |
| 9:   procedure doneRequest(req) |
| 10:     if req.id /= requests.peek( ).id then |
| 11:        finished[req.id] ← req |
| 12:     else |
| 13:        requests.dequeue( ) |
| 14:        respondClient(req) |
| 19:        while requests.peek( ) in finished do |
| 16:           invReq ← requests.dequeue( ) |
| 17:           resReq ← finished[invReq.id] |
| 18:           respondClient(resReq) |
| 19:     end if |

| Algorithm 3 Duplex sorting in propagator leader |
|---|
| 1:   record ← Queue◁ A queue for recording requests |
| 2:   pending ← Map◁ A request map for pending propagation |
| 3:   procedure recordReqest(req)◁ Record the order of requests |
| 4:      record.enqueue (req) |
| 5:   procedure startPropagate(req)◁ Propagate requests based on the record |
| 6:      if req.id ≠ record.peek ( ) .id then |
| 7:         pending[req.id ] ←req |

$G_{xy}$, if an upgrade happened in between of $w_x{}^3r_x$. To avoid order contradiction, the upgrade may provide for a client to start a write request $w_{up}$, then wait until the request has been committed in the group of $\{p \cup q\}$. To provide a downgrade function, a client that belongs to group $G_p$ can directly downgrade its group to group $G_q$, if q is subset of p. Note that access across the same group is also considered a downgrade operation. $G_p$ holds a subset of σ order in group $G_q$. In other words, p contains a "slower" replica of q. It may not be feasible to have order contradiction without violating sequential consistency in the down-grade. The downgrade mechanism allows a client to achieve higher performance if it no longer requires consistency with some other partitions.

Various elements, which are described herein in the context of one or more embodiments, may be provided separately or in any suitable sub combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A computer-implemented method, comprising:
   maintaining, by one or more processors, a propagatable partition tree, the propagatable partition tree comprising a plurality of nodes corresponding to a group of one or more processes, the propagatable partition tree determining the commit order between each of the plurality of nodes, the groups of one or more processes comprising a plurality of primitive groups and a plurality of composer groups, wherein the one or more processors implement inverse propagation to transmit requests through the propagatable partition tree;
   receiving, by a first processor of a distributed processing system, a plurality of write requests for a data item, the plurality of write requests comprising a first write request for the data item and a second write request for the data item;
   storing, by the first processor, a timestamp for each write request of the plurality of write requests and metadata associated with each write request;
   determining, by the first processor, a global order for the plurality of write requests, based on an index assigned to respective write requests of the plurality of write requests, the index corresponding to the timestamp and the metadata associated with each write request; and
   executing, by the first processor, the plurality of write requests, according to the propagatable partition tree, based on the global order.

2. The computer-implemented method of claim 1, wherein the index comprises a first index, the method further comprising:
   receiving, by a second processor of the distributed processing system, a plurality of read requests for a data item, the plurality of read requests comprising a first read request for the data item and a second read request for the data item;
   storing, by the second processor, a timestamp for each read request in the plurality of write request and metadata associated with each read request;
   determining, by the second processor, a global read order for the plurality of read requests, based on a second index assigned to respective read requests of the plurality of read requests, the second index corresponding to the timestamp and the metadata associated with each read request; and
   executing, by the second processor, the plurality of read requests, according to the propagatable partition tree, based on the global read order for the plurality of read requests.

3. The computer-implemented method of claim 2, further comprising:
   broadcasting, by the first processor to the second processor, the first write request for the data item and the second write request for the data item;
   broadcasting, by the second processor to the first processor, the first read request for the data item and the second read request for the data item; and
   assigning, by the one or more processors, the first index and the second index, to the first write request for the data item, the second write request for the data item, the first read request for the data item, and the second read request for the data item.

4. The computer-implemented method of claim 2, wherein determining the global read order for the plurality of read requests comprises ordering, by the one or more processors, one or more operations corresponding to the global read order, based on the first index and the second index assigned to each of the respective write and read requests, the one or more operations including the first write request, the first read request, the second write request, and the second read request.

5. The computer-implemented method of claim 4, further comprising:
   determining, by the one or more processors, a first local order for the one or more operations of a first data center;
   determining, by the one or more processors, a second local order for the one or more operations of a second data center; and
   generating, by the one or more processors, a local order for the one or more operations of the first data center and second data center, based on the first local order and the second local order.

6. The computer-implemented method of claim 1, wherein the propagatable partition tree comprises a distributed inverted tree structure.

7. The computer-implemented method of claim 1, further comprising propagating, by the one or more processors, the propagatable partition tree based on the global order by a first composition or a second composition.

8. The computer-implemented method of claim 7, wherein propagating the propagatable partition tree further comprises imposing, by the one or more processors, a queue using a first-in-first-out order on commit messages received from different partitions, based on an arrival time of the commit messages, to sort write requests.

9. The computer-implemented method of claim 8, wherein propagating the propagatable partition tree comprises:
   blocking, by the one or more processors, a first commit message based on an order of messages in the first-in-first-out order of the queue;
   executing, by the one or more processors, a second commit message based on the order of messages in the first-in-first-out order of the queue; and
   executing, by the one or more processors, the first commit message after the completion of the second commit message.

10. The computer-implemented method of claim 8, wherein propagating the propagatable partition tree by the second composition comprises:
    receiving, by the one or more processors, a first commit message and a second commit message by a leader, the leader recording an order for the first commit message and the second commit message; and
    executing, by the one or more processors, the first and second commit messages based on the order recorded by the leader.

11. A distributed processing system comprising:
    system memory;
    one or more processors in communication with the system memory, the one or more processors configured to:
    maintain a propagatable partition tree, the propagatable partition tree comprising a plurality of nodes corresponding to a group of one or more processes, the propagatable partition tree determining the commit order between each of the plurality of nodes, the groups of one or more processes comprising a plurality of primitive groups and a plurality of composer groups, wherein the one or more processors implement inverse propagation to transmit requests through the propagatable partition tree;
    receive a plurality of write requests for a data item, the plurality of write requests comprising a first write request for the data item and a second write request for the data item;
    store a timestamp for each write request of the plurality of write requests and metadata associated with each write request;
    determine a global order for the plurality of write requests, based on an index assigned to respective write requests of the plurality of write requests, the index corresponding to the timestamp and the metadata associated with each write request; and
    execute the plurality of write requests, according to the propagatable partition tree, based on the global order.

12. The distributed processing system of claim 11, wherein the index comprises a first index, wherein the one or more processors are further configured to:
    receive a plurality of read requests for a data item, the plurality of read requests comprising a first read request for the data item and a second read request for the data item;
    store a timestamp for each read request in the plurality of write request and metadata associated with each read request;
    determine a global read order for the plurality of read requests, based on a second index assigned to respective read requests of the plurality of read requests, the second index corresponding to the timestamp and the metadata associated with each read request; and
    execute the plurality of read requests, according to the propagatable partition tree, based on the global read order for the plurality of read requests.

13. The distributed processing system of claim 12, wherein the one or more processors are further configured to:
    broadcast the first write request for the data item and the second write request for the data item;
    broadcast the first read request for the data item and the second read request for the data item; and
    assign the first index and the second index, to the first write request for the data item, the second write request for the data item, the first read request for the data item, and the second read request for the data item.

14. The distributed processing system of claim 12, wherein, to determine the global read order for the plurality of read requests, the one or more processors are further configured to order one or more operations corresponding to the global read order, based on the first index and the second index assigned to each of the respective write and read requests, the one or more operations including the first write request, the first read request, the second write request, and the second read request.

15. The distributed processing system of claim 14, wherein the one or more processors is further configured to:
    determine a first local order for the one or more operations of a first data center;
    determine a second local order for the one or more operations of a second data center; and
    generate a local order for the one or more operations of the first data center and second data center, based on the first local order and the second local order.

16. The distributed processing system of claim 11, wherein the propagatable partition tree comprises a distributed inverted tree structure.

17. The distributed processing system of claim 11, wherein the one or more processors are further configured to propagate the propagatable partition tree based on the global order of the by a first composition or a second composition.

18. The distributed processing system of claim 17, wherein, to propagate the propagatable partition tree, the one or more processors are further configured to impose a queue using a first-in-first-out order on commit messages received from different partitions based on an arrival time of the commit messages, to sort write requests.

19. The distributed processing system of claim 17, wherein, when propagating the propagatable partition tree by the first composition, the one or more processors is further configured to:

block a first commit message based on an order of messages in the first-in-first-out order of the queue;
execute a second commit message based on the order of messages in the first-in-first-out order of the queue; and
execute the first commit message after the completion of the second commit message.

20. The distributed processing system of claim 17, wherein, to propagate the propagatable partition tree by the second composition, the one or more processors are further configured to:

receive a first commit message and a second commit message by a leader, the leader recording an order for the first commit message and the second commit message; and
execute the first and second commit messages based on the order recorded by the leader.

\* \* \* \* \*